G. W. Cooper.
Upsetting Tires.
Nº 20,700.   Patented Jun. 29, 1858.

UNITED STATES PATENT OFFICE.

G. W. COOPER, OF MORENCI, MICHIGAN.

UPSETTING TIRES.

Specification of Letters Patent No. 20,700, dated June 29, 1858.

*To all whom it may concern:*

Be it known that I, G. W. COOPER, of Morenci, in the county of Lenawee and State of Michigan, have invented a new and Improved Device for Upsetting Wheel-Tires and other Curved or Straight Bars; and I do hereby declare that the following is a full, clear, and exact description of the same, reference being had to the annexed drawings, making a part of this specification, in which—

Figure 1:
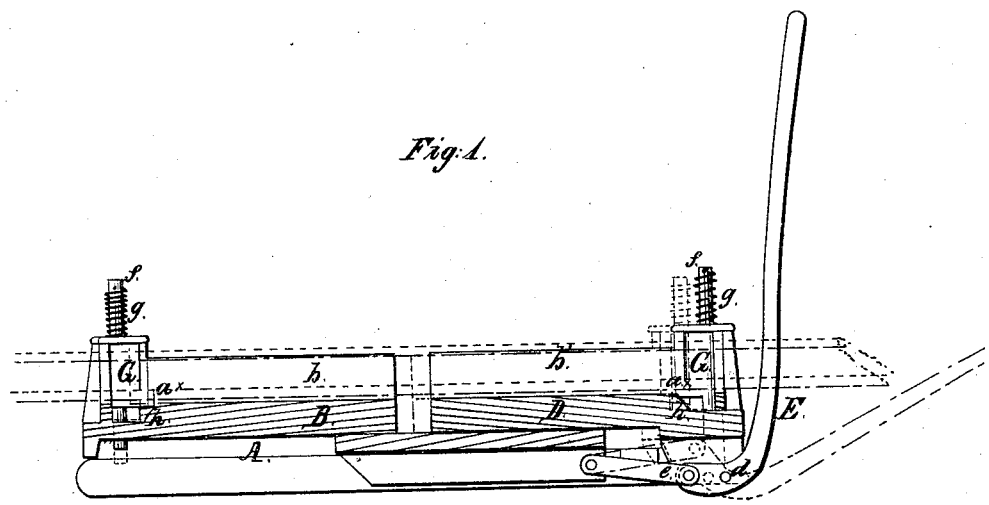
Figure 2:
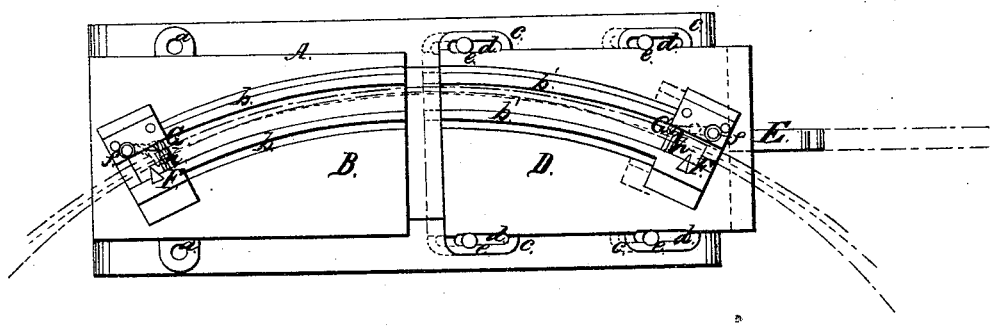

Figure 1, is a longitudinal vertical section of my improvement taken in the line $x$, $x$, Fig. 2. Fig. 2, is a plan or top view of the same.

Similar letters of reference indicate corresponding parts in the two figures.

This invention consists in a novel arrangement of the jaws or clamps which grasp the tire or bar to be upset and which, owing to their novel arrangement, allow the bar while being compressed or upset to be firmly pressed down upon its bed, thereby rendering the device much more efficient in its operation than other devices for the same purpose with which I am acquainted.

To enable those skilled in the art to fully understand and construct my invention I will proceed to describe it.

A, represents a bed plate which may be of cast iron, and B, is a plate attached by bolts $a$, to one end of the bed plate A. The plate B, has two curved ledges $b$, $b$, formed on its upper surface, said ledges being segments of a circle corresponding to the tire to be upset, and having a sufficient space between them to receive the tire which is designated by C.

D, represents a plate which is attached to the opposite end of the bed plate A, in such a way that it is allowed to slide thereon. This plate is provided with flanches $c$, at each side, said flanches having oblong slots $d$, through them, through which screws $e$, pass into the bed plate A. The plate D, has two curved ledges $b'$, $b'$, on its upper surface, the ledges of both plates B, D, being segments of circles of equal diameter.

To the under side of the plate D, a lever E, is pivoted, as shown at $d$, and the lower end of this lever is connected by a link $e$, to the under side of the bed-plate A. The plate D, is operated by actuating the lever E.

At each end of one of the ledges $b$, $b'$, of the plates B, D, a stationary jaw F, is placed. These jaws are merely three sided vertical steel bars brought to an edge at their outer sides and fitted in their ledges in dove-tail form as shown clearly in Fig. 2. In the ends of the opposite ledges vertical rods $f$, are fitted and a jaw G, is formed on each rod, said jaws being curved plates brought to an edge on the outer sides. The rods $f$, are allowed to turn in their respective ledges and each rod has a spiral spring $g$, placed on it, said springs having a tendency to keep the edges of the jaws G, thrown inward as shown in black in both figures. The springs $g$, also have a tendency to keep the rods $f$, and the jaws G, elevated to their fullest extent, the rods $f$, and consequently the jaws G, having a certain degree of vertical movement or play allowed them. The lower end of each jaw G, is provided with a toe or projection $a^x$, shown clearly in Fig. 1. The outer edges of the bottoms of the spaces between the ledges $b$, $b'$, are made inclined as shown at $h$, see more particularly Fig. 2.

The implement is used as follows:—The lever E, has its outer end elevated and the movable plate is thereby drawn back from the stationary plate B. The tire being properly heated at the proper point is then fitted between the ledges $b$, $b'$, of both plates B, D, the tire C, resting on the toes or projections $a^x$, of the jaws G, and throwing said jaws toward the stationary jaws F, in consequence of the jaws G, resting on the inclined planes $h$. The tire is firmly grasped by the jaws F, G, and pressed firmly down on its bed and the tire is compressed or upset as the plate D, is forced toward the plate B, by depressing the lever E. When the work is completed, the outer end of lever E, is thrown upward and the springs $g$, at once release the jaws G, from the tire.

From the above description it will be seen that straight bars may be upset with equal facility by having straight ledges $b$ $b'$. The same arrangement of jaws however would be used in both cases.

Having thus described my invention what

I claim as new and desire to secure by Letters Patent, is—

The jaws G, attached to rods $f$, which are provided with springs $g$, and have a vertical movement as well as a rotating one, and the inclined planes $h$, in the bed plate below the jaws G, the above parts being used in connection with the stationary jaws F, the jaws being applied to the ledges $b$, $b$, of the plates B, D, and arranged as and for the purpose set forth.

G. W. COOPER.

Witnesses:
ALVAH HOLT,
SIMON D. WILSON.